United States Patent [19]

Corvino et al.

[11] Patent Number: 4,862,314
[45] Date of Patent: Aug. 29, 1989

[54] SYSTEM FOR PROVIDING POWER TO A CENTRAL OFFICE PROTECTOR MODULE WITH ALARM INDICATOR AND INCLUDING REMOTE ALARM INDICATION

[75] Inventors: Phil Corvino, Naperville; Tom McCormick, Dwight, both of Ill.

[73] Assignee: Reliance Comm/Tec Corporation, Chicago, Ill.

[21] Appl. No.: 202,713

[22] Filed: Jun. 3, 1988

[51] Int. Cl.[4] ............................................. G08B 17/06
[52] U.S. Cl. .................................... 361/119; 361/124; 340/650; 340/662
[58] Field of Search .................. 337/32; 340/650, 651, 340/654, 656, 662, 664; 361/119, 124

[56] References Cited

U.S. PATENT DOCUMENTS

| 3,587,021 | 6/1971 | Baumbach | 337/32 |
| 3,794,947 | 2/1974 | Baumbach | 337/32 |
| 4,045,714 | 8/1977 | MacLeod | 340/664 |
| 4,168,515 | 9/1979 | Baumbach | 361/124 |
| 4,287,515 | 9/1981 | Raber et al. | 340/650 |
| 4,502,088 | 2/1985 | Baumbach | 361/124 |

OTHER PUBLICATIONS

Reliable Electric/Utility Products, Reliance Comm/-Tec Corporation—Catalog pp. A-300 and A-301 entitled "Connector Description".
Catalog Reliable Electric/Utility Products, Reliance Comm/Tec Corp. dated 1/82, pp. A-305 and A-306 entitled "Resettable Heat Coil Modules".
Catalog p. A-310 entitled "Accessories", dated 1/82, Reliable Electric/Utility Products, Reliance Comm/-Tec Corporation.

Primary Examiner—A. D. Pellinen
Assistant Examiner—Jeffrey A. Gaffin
Attorney, Agent, or Firm—Michael M. Rickin

[57] ABSTRACT

A system for providing power to a central office protector module which has a visual indicator for indicating an alarm whenever one of the two lines protected by the module is shorted to ground by the module. The system includes at least one connector block which has a group of receptacles for receiving the module. The system includes a power supply which converts central office battery to a relatively low amplitude voltage to provide power to the alarm indicator. Current flows only when the module shorts the line to ground. The power supply also includes its own alarm indicator and also has provision to test that indicator and provide a remote alarm.

18 Claims, 4 Drawing Sheets

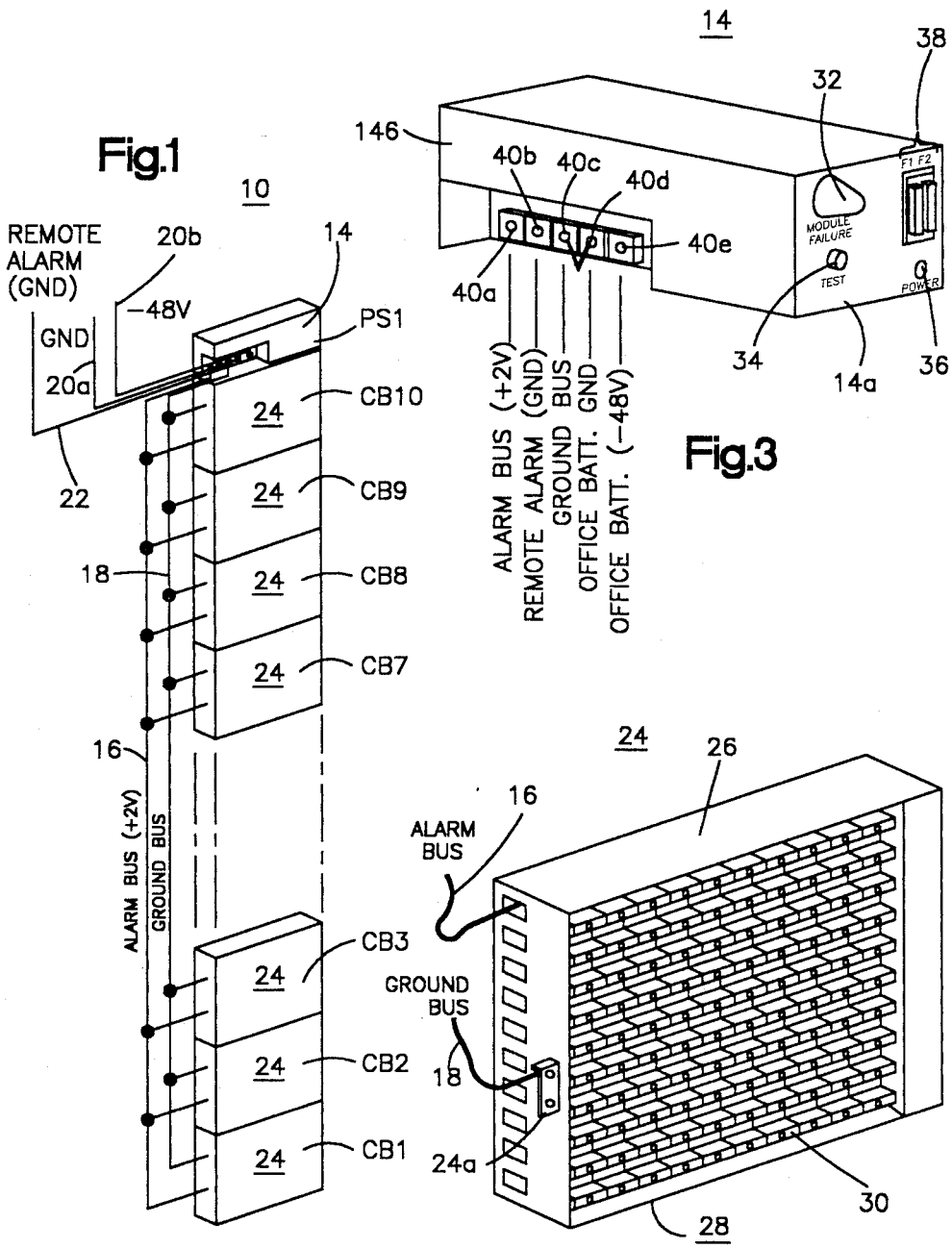

SYSTEM FOR PROVIDING POWER TO A CENTRAL OFFICE PROTECTOR MODULE WITH ALARM INDICATOR AND INCLUDING REMOTE ALARM INDICATION

CROSS REFERENCE TO RELATED APPLICATIONS

Of interest are the following copending applications which are all filed on even date herewith and are all assigned to the same assignee as the present application:

(1) Serial No. 202,702, entitled "Central Office Protector Module With Alarm Indicator" based on the invention of R. Kaczmarek, which application discloses a module for use in the system for the present invention.

(2) Serial No. 202,226, entitled "Telephone Distribution Frame Connector Assembly For Use With Central Office Protector Module Having Alarm Indicator" based on the invention of J. Unger, which application discloses a connector assembly for use in the system of the present invention.

BACKGROUND OF THE INVENTION

1. Field of the Invention

This invention relates to central office protector modules which provide a visual alarm indication when either of the incoming telephone lines protected by the module are shorted to ground and more particularly to the supplying of power to the modules and the appearance of the alarm indication also at a location remote to the module.

2. Description of the Prior Art

Central office protector modules which provide a visual indication of the mechanical type when either of the lines protected by the module are shortened due to a sustained overcurrent are known. One example of such a module is that disclosed in U.S. Pat. No. 3,587,021 entitled "Line Protector For A Communications Circuit" which issued on June 22, 1971 and is assigned to the same assignee as is the present invention. The module disclosed therein includes an alarm pin which is connected to ground when a sustained overcurrent condition grounds either of the two lines protected by the module. The '021 patent indicates that the grounding of the alarm pin can be used to close a circuit in the central office such that an external audible or electric lamp alarm device can be energized.

A module of the type disclosed in the '021 patent is the type R1104B module sold by assignee's Reliable Electric/Utility Products operating unit. That module plugs into a type 700 connector also sold by that same operating unit. Typically, a number of those connectors each holding a multiplicity of such modules are mounted on a single frame. An electrical lamp, i.e., a bulb, can be mounted on the frame to provide a visual indication that one of the multiplicity of the modules in that frame has connected its alarm pin to ground, i.e. closed the alarm circuit. The power for lighting the lamp is provided from the central office battery, typically −48 V. Wiring all of the alarm pins of all of the modules in the frame together provides a single wire which can then be wired to one side of the lamp. The other side of the lamp is wired to the battery. The connection to ground by the occurrence of a sustained overcurrent condition of at least one module alarm pin in the frame closes the circuit to the lamp. Current then flows from the battery to light the lamp.

There has been increasing demand by telephone operating companies for a central office module which provides a visual indication not only when the module connects at least one of the two lines it is protecting to ground as a result of a sustained overcurrent, but also as a result of a sustained overvoltage. There has also been increased interest that the visual indication be in the form of a light which is part of the module. Such a light has the advantage over a mechanical type indicator of the '021 module of being easily visible not only when the office is not that well lit, but also in a well lit office which may have several hundred or more connectors each holding up to 100 modules arranged in a multiplicity of racks. In a module which has its own visual indication in the form of a light included as part of the module, it is necessary to provide power to each module. It is advantageous and safer to provide such power in the form of a relatively low amplitude voltage rather than at the central office battery voltage. It is desirable that the system for providing such power include on the power supply a visual indication of a module failure and a means for testing that indicator. It is also desirable that the system include provision for an indication of module failure at a location remote from the power supply. It is further desirable that such a system allow each of the connector blocks in a given rack to be isolated one at a time so that the number of modules which have failed on that block can be determined.

Summary of the Invention

A system for providing power to a central office protector module which has a means to indicate an alarm when the module shorts to ground upon the occurrence of at least one of a predetermined number of conditions.

The system includes at least one frame connector assembly which has a multiplicity of groups of receptacles. Each of the receptacle groups are for receiving a module. The system also has a power supply which converts voltage from a first source to a second voltage. That voltage appears across first and second terminals of the power supply. The second terminal is connected to ground.

A first transmission means connects the power supply first terminal to a first terminal of the connector assembly. The assembly first terminal is connected to one of the receptacles in each group. A second transmission means connects the power supply second terminal to a second terminal of the assembly. The assembly second terminal is connected to another one of the receptacles in each group.

Current flows from the power supply to one or more of the receptacle groups only when a module which is in that group has shorted to ground upon the occurrence of at least one of the predetermined number of conditions. The current activates the module alarm indicator.

Description of the Drawing

FIG. 1 is a block schematic diagram of the system of the present invention.

FIG. 2a is a representation of a connector block which can be used in the system of FIG. 1.

FIG. 2b is a perspective of a module which can be used in the connector block of FIG. 2a.

FIG. 3 shows the perspective of a power supply which can be used in the system of FIG. 1.

Description of the Preferred Embodiment

Figure 2B:
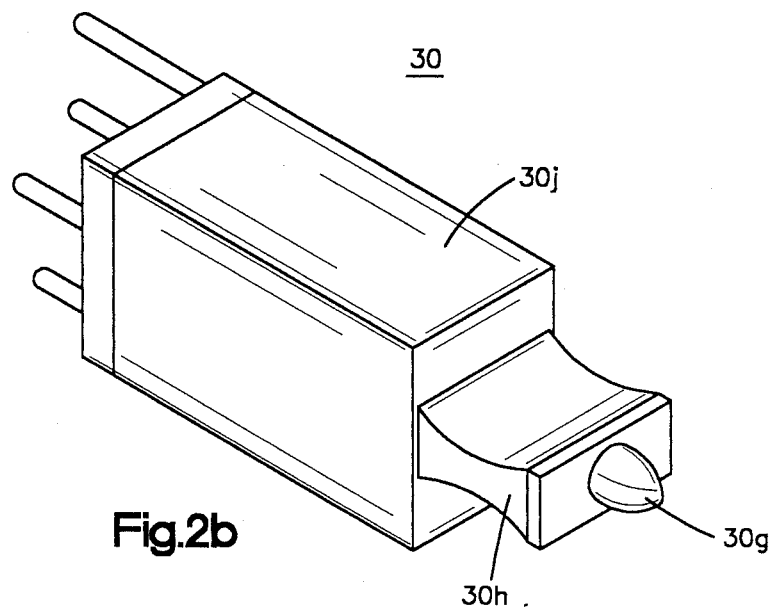

Referring now to FIG. 1 there is shown a block-schematic diagram of a system 10 in which the present invention may be used. System 10 is located at a telephone central office and includes an equipment rack 12 which for ease of illustration is shown in representational form. Rack 12 includes ten telephone frame connector assemblies also known as connector blocks CB 1 to CB 10. Rack 12 also includes a power supply 14 embodied in accordance with the present invention. An alarm bus 16 interconnects CBs 1 to 10 and supply 14. Similarly a ground bus 18 interconnects CBs 1 to 10 and supply 14. The purposes of busses 16 and 18 will be described in more detail below.

Wires 20a and 20b are connected, respectively, between the ground and the "hot" side of the central office DC supply (typically −48 V) and supply 14. A wire 22 is connected between supply 14 and a remote alarm indication.

Referring now to FIG. 2a there is a representation of a connector block 24 which can be used for CB 1 to CB 10. As is well known in the art a connector block for central office protector modules typically has a housing 26 to which a module field 28 as well as test and equipment fields (not shown) are attached. The block 24 also typically includes means (not shown) by which it can be mounted to rack 12.

The block 24 provides a means of protecting central office equipment from overvoltage and overcurrent conditions occurring on the cable pairs entering the office from the subscribers. The incoming cable pairs are connected to the cable pairs to the central office switch at block 24. For ease of illustration those cable pairs are not shown in FIG. 2a.

Each cable pair has its own associated protector module 30. A perspective of one such module for use in block 24 is shown in FIG. 2b. Typically block 24 includes 100 of modules 30. The block 24 is designed in a manner such that the interconnection between one of the incoming cable pairs and one of the central office cable pairs requires a module 30 to be inserted in the block in order to have a complete circuit.

Figure 2C:
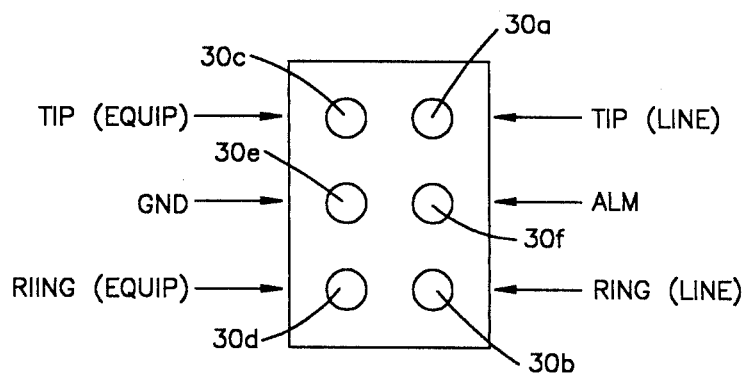
FIG. 2c shows the bottom of the module of FIG. 2b.

As can be seen by referring to FIG. 2c, module 30 has six pins which project outwardly from its bottom. Two of those pins 30a and 30b are associated with the incoming cable pair. Another two of those pins 30c and 30d are associated with central office cable pair. A fifth pin 30e is the ground pin. The sixth pin 30f is the alarm pin of the present invention which in normal operating conditions is connected to a relatively low amplitude positive DC voltage.

The occurrence of a sustained overvoltage or a persistent overcurrent on either of the wires of the incoming cable pair will cause module 30 to ground that wire. Internally to module 30 the occurrence of either of the above described conditions causes the associated pin 30a or 30b to be connected to ground pin 30e. Module 30 is also designed such that the grounding of either pin 30a or 30b also results in the closing of the alarm circuit in the module.

Referring once again to FIG. 2b it is seen that module 30 includes a light emitting diode (LED) 30g which is in the neck of 30h of the module's nonconductive housing 30j. Under normal operating conditions LED 30g is unlit. Upon the closing of the alarm circuit, the LED lights to thereby provide a visual indication of alarm condition. In the module, the LED is connected in series between the alarm pin 30f and a contact which is open under normal operating conditions. That combination of alarm pin, LED and contact is the module alarm circuit. Upon the occurrence of either of the conditions described above the open contact is closed to connect the LED to ground pin 30e. This completes the alarm circuit and a current flows through the LED causing it to light. A more detailed description of a protector module suitable for use in system 10 may be had by referring to the copending 202,702 application.

As module 30 has six pins, connector block 24 must have six receptacles for receiving the same. While not shown in FIG. 2a it is well known in the art that block 24 includes a means to interconnect all of the ground pins of the modules 30 connected to the block. Block 24 also includes on its exterior a means such as 24a which provides access to that ground such that it can be connected to a ground available at the central office. Ground bus 18 described in connection with FIG. 1 is connected to block external ground means 24a.

Block 24 must be designed so that the relatively low amplitude positive DC voltage which appears on pin 30f is provided to each of the modules 30 that are plugged into the block. Alarm bus 16 described in connection with FIG. 1 is connected to block 24 and the block is wired internally in a manner such that it is connected to the receptacle associated with pin 30f for each of the up to 100 such modules 30 that can be connected to block 24. Alarm bus 16 is also connected to power supply 14 which is the source of the relatively low amplitude positive DC voltage provided to alarm pin 30f. A more detailed description of a connector block suitable for use in system 10 may be obtained by referring to the copending 202,226 application.

Referring now to FIG. 3 there is shown a perspective of power supply 14. Supply includes on its front face 14a, a module failure lamp 32 which in accordance with the present invention lights if one or more of modules 30 has its associated alarm circuit closed. Supply 14 also includes on front face 14a, a circuit test button 34 which when depressed disconnects supply 14 from any remote alarm indication and provides a simulated alarm condition to thereby light lamp 32. Finally, front panel 14a also includes a power indicator lamp 36 to indicate the presence, absence or improper wiring of power to supply 14, and fuses 38.

Supply 14 includes on its left side the five terminals 40a to 40e. The alarm bus 16 (see FIG. 1) is connected to terminal 40a to provide the relatively low amplitude positive DC voltage to the alarm pin 30f of each module 30. Ground bus 18 (see FIG. 1) is connected to terminal 40c to provide a return path for current flow when one or more of modules 30 has its associated alarm circuit closed.

Wires 20a and 20b (see FIG. 1) are connected, respectively, to terminals 40d and 40e. As these wires are also connected, respectively, to the ground and the "hot" side of the control office DC supply they provide the input power for supply 14. Terminals 40c and 40d are connected to each other as they are both connected to ground. Wire 22 (see FIG. 1) is connected to terminal 40b. This wire is used to provide a remote alarm indication, i.e., an alarm indication in addition to that provided by the module LED 30g and the lamp 32 of supply 14.

Figure 4:
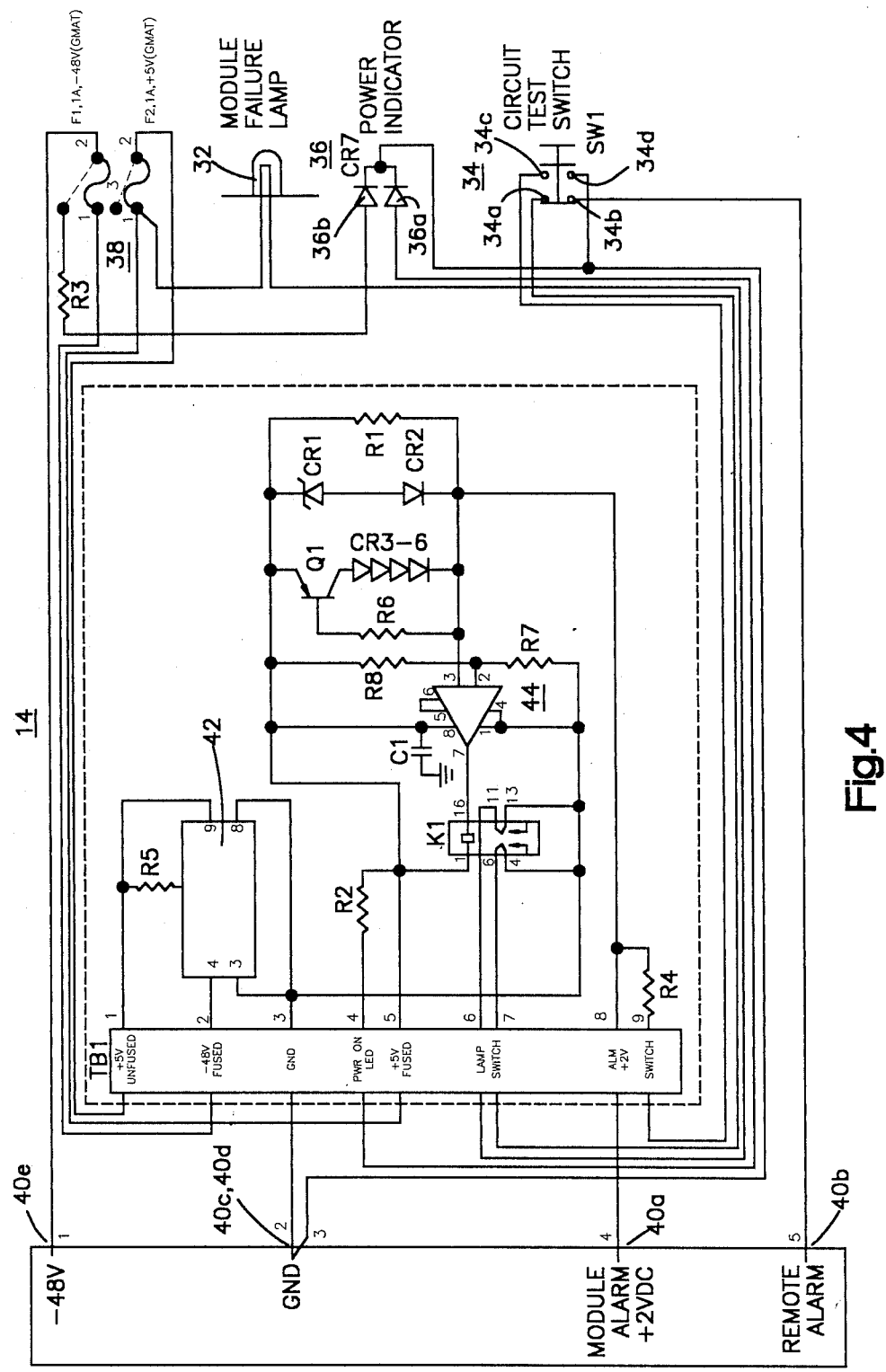
FIG. 4 shows a detailed schematic circuit diagram for the power supply.

Supply 14, a detailed schematic for which is shown in FIG. 4, is essentially a DC to DC converter which converts the relatively high amplitude control office DC supply (typically −48 V) to the relatively low amplitude positive DC voltage on alarm bus 16. In the embodiment for supply 14 being described herein that relatively low amplitude DC voltage is nominally +2 V. While the central office DC supply is typically −48 V, supply 14 has been designed to operate with a DC supply which may range in amplitude from −36 V to −72 V.

Referring now to FIG. 4, there is shown a detailed schematic circuit diagram for supply 14. As has been previously described, supply 14 converts the relative high amplitude negative DC voltage available at the central office to a relatively low amplitude positive DC voltage. To that end, supply 14 includes DC to DC converter 42 which has its input connected directly to terminal 40d and through one of the fuses 38 to terminal 40e. Converter 42 provides at its output a relatively low amplitude, relatively constant, positive DC voltage which for the embodiment of supply 14 being described herein is +5 V. Any one of a number of commercially available DC to DC converters such as the type PKA 4211P converter manufactured by Rifa Incorporated of Greenwich, CT can be used for converter 42.

The +5 V output of converter 42 is connected through another one of fuses 38 to normally closed relay K1. It is also provided by a voltage divider network made up of resistors R7 and R8 to the noninverting input of comparator 44 to thereby serve as a reference voltage. The +5 V output of converter 42 is also provided to the emitter of transistor Q1 and resistor R1.

The transistor Q1 has its base connected by resistor R6 to the inverting input of comparator 44. The transistor Q1 has its collector connected by the series combination of the four diodes CR 3-6 to the inverting input of comparator 44. The inverting input is also connected to terminal 40a to provide the relatively low amplitude positive DC voltage to the modules 30.

When one of the modules 30 has its associated alarm circuit closed, current can flow from supply 14 through alarm bus 16 to thereby light the associated LED. Transistor Q1 provides that current. The diodes CR3-6 connected between the collector of Q1 and bus 16 limits that current so that it does not exceed the upper rating of the LED. If other modules also have their alarm circuit closed, supply 14 also provides the current to light the associated LEDs 30g. As has been previously described, rack 12 includes ten connector blocks each of which can hold up to 100 modules. System 10 then has 1,000 modules. Supply 14 has been designed to provide power to light the LEDs of up to about ten percent of those modules. Such a condition might occur when for example as a result of an electrical storm, a lighting strike has occurred on many of the incoming cable pairs connected to rack 12.

If more than ten percent of the modules 30 in rack 12 should have their alarm circuits closed at any one time, then supply 14 will not be able to provide sufficient power to light the associated LEDs. The module failure lamp 32 and any remote alarm lamp connected to wire 22 will, however, be light. As will be described in more detail hereinafter in connection with FIG. 5, it is possible to include in system 10 a network which allows each connector block CB1 to 10 to be isolated one at a time to determine which modules on that block have failed, i.e. have had its associated alarm circuit closed.

The flow of current which results when at least one of the modules 30 has its alarm circuit closed causes the voltage on the inventing input of comparator 44 to drop below the reference voltage. The output of comparator 44 which is connected to relay K1 changes state to thereby shut off the flow of current to the relay. As a result, the relay opens to thereby provide a path for current flow from DC to DC converter 42 to module failure lamp 32 and remote alarm wire 22. Lamp 32 lights to indicate a module failure.

As has been previously described supply 14 includes a circuit test button 34. When button 34 is depressed, it causes switch SW1 to open contacts 34a and 34b and close contacts 34c and 34d. The opening of contacts 34a and 34b opens the internal connection in supply 14 to terminal 40b. The closing of contacts 34c and 34d places a ground in supply 14 on the internal connection in supply 14 to terminal 40a. This simulates a module failure to thereby light lamp 32.

Power indicator lamp 36 includes two light emitting diodes 36a and 36b. Diode 36a provides a green light to indicate the presence of input power to supply 14. Diode 36b provides a red light to indicate that the input power to supply 14 has been improperly wired. Of course, the associated one of fuses 38 must be replaced when the wires are reconnected properly. When lamp 36 is dark, it indicates the absence of input power to supply 14.

Figure 5:
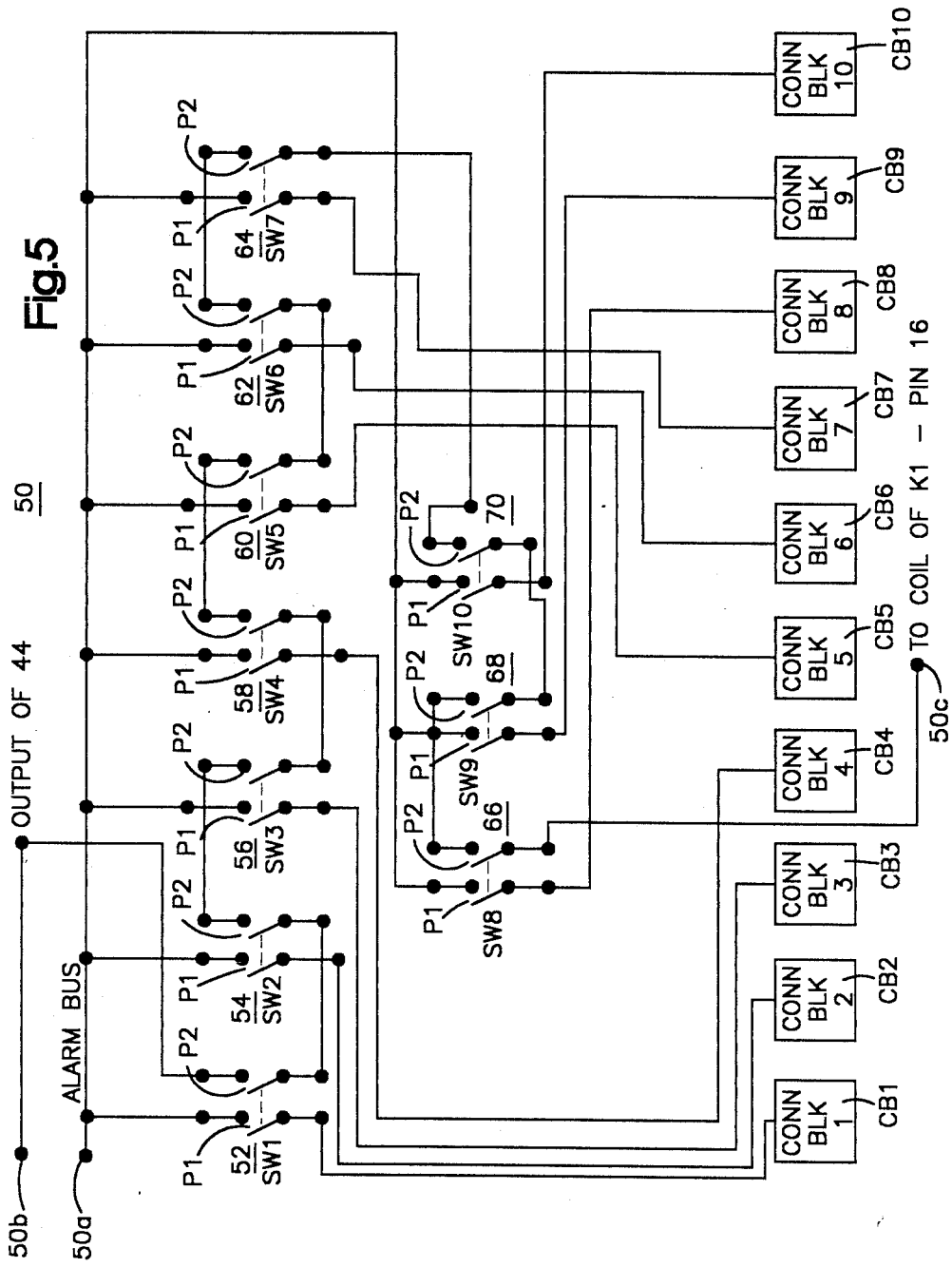
FIG. 5 shows a schematic diagram for a network which can be included in the system of FIG. 1 so that the connector blocks can be isolated one at a time.

Referring now to FIG. 5, there is shown a schematic diagram for a network 50 which would allow each of the ten connector blocks CB1 to 10 to be isolated one at a time to determine the number of modules that have failed on an individual block. As was described in connection with FIG. 4, supply 14 has been designed to provide enough power to light the LEDs 30g of slightly more than ten percent of the 1,000 modules 30 in rack 12. If the total number of modules 30 which have failed at any one time exceeds the rating of supply 14, none of the module LEDs 30g will light. Telephone company operating personnel will, however, be aware that a failure has occurred as failure lamp 32 on supply 14 will light as well as any remote alarm lamp connected to wire 22.

Network 50 includes ten switches 52, 54, 56, 58, 60, 62, 64, 68 and 70 each associated with a respective one of the blocks CB1 to 10. The switches 52 to 70 which are of the double pole, single throw type are each connected as shown in FIG. 5 between the associated one of blocks CB1 to 10, alarm bus 16 at network terminal 50a, the output of comparator 44 at network terminal 50b and the terminal of the coil of relay K1 connected to the output of comparator 44 at network terminal 50c.

The two poles of each of the switches 52 to 70 are designated as P1 and P2. Pole P1 of each switch connects the alarm bus 16 to the associated one of blocks CB1 to 10. For example, pole P1 of switch 52 connects the alarm bus 16 to CB1. It should be appreciated that by using the ten switches 52 to 70, the alarm bus 16 is in effect converted into ten alarm busses each associated with a respective one of blocks CB1 to 10. When switch 52 is open, the alarm bus 16 is disconnected from that block, i.e. supply 14 does not provide any power to light the LEDs 30g of any failed modules 30 in that block. Therefore, when the total number of failed modules 30 in system 10 exceeds the power rating of supply 14, the failed modules on each of blocks CB1 to 10 can be determined by opening all but that one of the switches associated with the selected block. The failed modules can then be replaced to restore service to the associated subscriber.

Network 50 also includes an interlock feature which requires that all of the switches 52 to 70 must be closed in order for system 10 to cease providing a remote alarm indication. In other words, as long as one or more switches 52 to 70 are open a remote alarm indication will appear at the central office. The manner in which the interlock feature of network 50 operates will now be described.

As can be seen from FIG. 5, pole P2 of each of the ten switches 52 to 70 are connected in series with each other. As was previously described, network 50 is connected by terminals 50b and 50c between the output of comparator 44 and the coil of relay K1. The relay K1 is normally closed. The occurrence of one or more module failures causes the output of comparator 44 to change state to shut off the flow of current to the relay. In a similar manner, if any one of the ten switches 52 to 70 is left open, there is no current flow to the coil of relay K1 even if all of the failed modules have been replaced. Current will flow to the coil of the relay only if both all of the failed modules have been replaced and all of the switches 52 to 70 are closed. Until that occurs, system 10 will continue to provide a remote alarm indication.

It is to be understood that the description of the preferred embodiment is intended to be only illustrative, rather than exhaustive, of the present invention. Those of ordinary skill will be able to make certain additions, deletions and/or modifications to the embodiment of the disclosed subject matter without departing from the spirit of the invention or its scope, as defined by the appended claims.

What is claimed is:

1. A system for providing power to a protector module having means for indicating an alarm when said module shorts to ground, said system comprising:
   (a) at least one frame connector assembly having a multiplicity of groups of receptacles, each of said groups for receiving one of said modules;
   (b) a first transmission means;
   (c) a second transmission means and;
   (d) power supply means for generating a voltage across first and second terminals of said power supply means, said second terminal connected to ground, said first transmission means for connecting said power supply means first terminal to a first terminal of said frame connector assembly which is connected to one of said receptacles in each of said groups, said second transmission means for connecting said power supply means second terminal to a second terminal of said frame connector assembly which is connected to another one of said receptacles in each of said groups, current flowing from said power supply means to one or more of said groups only when a module received in each of said groups has shorted to ground, said current activating said module alarm indicating means, said power supply means comprising;
      (i) means responsive to said current for indicating an alarm when at least one of said modules has shorted to ground; and
      (ii) means for simulating the shorting of a module to ground to thereby activate said power supply alarm indicating means.

2. The system of claim 1 wherein said power supply means is connected to a source of voltage which has a relatively high amplitude for generating therefrom said terminals voltage and said terminals voltage has a relatively low amplitude.

3. The system of claim 2 wherein said source is a central office battery.

4. The system of claim 1 wherein said power supply means includes a third terminal, a signal appearing at said third terminal when at least one of said module alarm indicating means is activated.

5. The system of claim 1 wherein said power supply means further comprises means to limit the amplitude of said current to not exceed the rating of said module alarm indicating means.

6. The system of claim 1 further comprising another frame connector assembly having a multiplicity of groups of receptacles, each of said groups for receiving one of said modules, said first transmission means for connecting said power supply means first terminal to a first terminal of said another frame connector assembly which is connected to one of said receptacles in each of said another assembly groups and said second transmission means for connecting said power supply means second terminal to a second terminal of said another frame connector assembly which is connected to another one of said receptacles in each of said another assembly groups, said current flowing from said power supply means to said one or more of said another assembly groups only when a module received in each of said another assembly groups has shorted to ground, said current activating said module alarm indicating means.

7. The system of claim 6 further comprising means associated with each of said at least one assembly and said another assembly for disconnecting said associated assembly from said power supply means.

8. The system of claim 7 wherein said power supply means includes a third terminal, a signal appearing at said third terminal when at least one of said module alarm indicating means is activated.

9. The system of claim 8 wherein each of said disconnecting means includes means for maintaining said signal at said third terminal.

10. The system of claim 9 wherein each of said disconnecting means are double pole, single throw type switches and one of said poles of each of said switches connects said first transmission means to said associated one of said at least one and said another assembly and the other of said poles of each of said switches are connected in series with each other and to said power supply means.

11. The system of claim 1 wherein said module alarm indicating means is a light emissive device.

12. A system for providing power to a central office protector module having means for indicating an alarm when said module shorts to ground, said system comprising:
   (a) at least two frame connector assemblies each having a multiplicity of groups of receptacles, each of said groups for receiving one of said modules;
   (b) power supply means for generating a voltage across first and second terminals of said power supply means, said second terminal connected to said ground, said power supply means including means for indicating a module alarm;
   (c) a first transmission means for connecting said power supply means first terminal to a first terminal of each of said frame connector assemblies, each of said connector assemblies first terminal connected to one of said receptacles in each of said groups of receptacles;

(d) a second transmission means for connecting said power supply means second terminal to a second terminal of each of said frame connector assemblies, each of said connector assemblies second terminal connected to another one of said receptacles in each of said groups of receptacles, current flowing from said power supply means to one or more of said groups of receptacles only when a module received in each of said receptacle groups has shorted to ground, said current activating said module alarm indicating means and said power supply alarm indicating means; and (e) a network connected to said first transmission means, said power supply means and to each of said at least two assemblies, said network including means for selectively disconnecting one or the other of said assemblies from said first transmission means when said power supply alarm indicating means is activated.

13. The system of claim 12 wherein said power supply means further includes means for simulating the shorting of a module to ground to thereby activate said power supply alarm indicating means.

14. The system of claim 12 wherein said power supply means further includes means to limit the amplitude of said current to not exceed the rating of said module alarm indicating means.

15. The system of claim 12 wherein said power supply means includes a third terminal, a signal appearing at said third terminal when at least one of said module alarm indicating means is activated.

16. The system of claim 15 wherein said selective disconnecting means includes means for maintaining said signal at said third terminal.

17. The system of claim 12 wherein said selective disconnecting means is at least two double pole, single throw type switches each associated with a respective one of said assemblies, one of said poles of each of said switches connecting said first transmission means to said associated one of said at least two assemblies and the another of said poles of each of said switches are connected in series with each other and to said power supply means.

18. The system of claim 12 wherein said module alarm indicating means is a light emissive device.

* * * * *